(12) United States Patent
Kawana

(10) Patent No.: US 7,706,079 B2
(45) Date of Patent: Apr. 27, 2010

(54) PROJECTION ZOOM LENS SYSTEM AND PROJECTION TYPE DISPLAY APPARATUS

(75) Inventor: Masanao Kawana, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/421,972

(22) Filed: Apr. 10, 2009

(65) Prior Publication Data

US 2009/0257129 A1    Oct. 15, 2009

(30) Foreign Application Priority Data

Apr. 11, 2008    (JP)    ............................ P2008-104090

(51) Int. Cl.
*G02B 15/14*    (2006.01)
(52) U.S. Cl. ...................................... 359/680; 359/684
(58) Field of Classification Search ................. 359/680, 359/684, 682, 676
See application file for complete search history.

(56) References Cited

U.S. PATENT DOCUMENTS 7,227,693 B2 *    6/2007    Nakazawa et al. ........... 359/676
7,233,447 B2 *    6/2007    Baba ........................... 359/680
2006/0139766 A1    6/2006    Sawamoto

FOREIGN PATENT DOCUMENTS

JP    2006-162734 A    6/2006
JP    3954736 B2    8/2007

* cited by examiner

*Primary Examiner*—Alicia M Harrington
(74) *Attorney, Agent, or Firm*—Birch, Stewart, Kolasch & Birch, LLP

(57) ABSTRACT

A projection lens system includes, in order from the magnification side, a negative first group $G_1$ and positive second to fifth groups $G_2$ to $G_5$. In the lens system, the first group $G_1$ has aspheric surface, a lens closest to the magnification side ($L_7$) in the fourth group $G_4$ has an aspheric surface, and the fifth group $G_5$ is formed of one positive lens. During zooming, the first group $G_1$ and the fifth group $G_5$ remain stationary, while the second to fourth groups $G_2$ to $G_4$ are moved separately. Furthermore, the lens system satisfies the expression $0.8 < d34/fw$, where fw denotes a focal length of the whole system at the wide-angle end, and d34 denotes an air space between the third lens group $G_3$ and the fourth lens group $G_4$ at the wide-angle end.

18 Claims, 10 Drawing Sheets

PROJECTION ZOOM LENS SYSTEM AND PROJECTION TYPE DISPLAY APPARATUS

CROSS-REFERENCE TO RELATED APPLICATIONS

This application is based on and claims priority under 35 USC 119 from Japanese Patent Application No. 2008-104090 filed Apr. 11, 2008; the entire contents of which are incorporated herein by reference.

BACKGROUND

1. Technical Field

The present invention relates to a projection zoom lens system having a five-group configuration in which three groups are movable for zooming and mounted in a projection type display apparatus and to the projection type display apparatus having the projection zoom lens system. In particular, the invention also relates to a projection zoom lens system and a projection type display apparatus configured so that rays containing image information, which are generated from a light valve such as a transmissive or reflective liquid crystal display device or a DMD (Digital Micromirror Device) display device, are projected and magnified on a screen.

2. Related Art

In recent projectors, a projector having a configuration in which three light valves corresponding to illuminating rays of RGB three primary colors are employed is used. The rays modulated by the respective light valves are synthesized by a prism or the like. And an image is displayed on a screen through a projection lens.

Recently, a decrease in size and an increase in accuracy rapidly progress in the light valve mentioned above. Besides, with an increase in spread of PCs, the demands of performing presentation using such a projector increase. Hence, needs for a more high-performance and more small-sized lightweight projector arise. Accordingly, it is necessary for the projections lenses to satisfy the needs.

However, in a projector that synthesizes and projects the rays modulated from the three light valves by using a color synthesizing optical system, a projection lens system is in need of a long back focal length for disposing a prism and the like which synthesize colors. Furthermore, in a color synthesizing optical system, spectrum characteristic thereof is changed depending on an incident angle of incident rays. Thus, the projection lens system is required to have telecentricity, which is a property of a telecentric system in which an entrance pupil is sufficiently far away in view from reduction side. Further, there are required lens speed and aberration correction appropriate to resolution of an image pickup device, and in the case of front projection type, there are also required a zoom function and a wide angle of view in terms of installation. In addition, according to a decrease in size of the light valve, an increase in demand for mobile applications, and reduction in price of the apparatus, similarly to the other members, the projection lens system also has been strongly required to be reduced in size and weight.

As projection lenses satisfying the requirements mentioned above, there have been known projection lens systems configured such that five groups of negative-positive-positive-positive-positive or negative-positive-positive-negative-positive are arranged in order from the magnification side. In the lens system, during zooming, the first lens group and the fifth lens group remain stationary while the second lens group, the third lens group, and the fourth lens group are movable in an optical axis direction. Such projection lens systems are disclosed in Patent Documents 1 (JP-B-3954736) and 2 (JP-A-2006-162734 corresponding to US 2006/139766 A).

However, the projection lens systems disclosed in Patent Documents 1 and 2 are not enough to satisfy the recent strong requirement for projection lens systems in view of balance of various aberrations.

Meanwhile, if the possibility of optical design is expanded, for example, by increasing the number of lenses or lens groups movable for zooming, it is possible to improve lens performance. However, when lens performance is improved depending on such an increase in the number of components, increases in size and cost is directly caused, and a thickness of glass material increases in the whole lens system, thereby causing deterioration in spectral transmittance. The deterioration in spectral transmittance is remarkable in a short wavelength range, and becomes a disadvantageous factor particularly in a projector incapable of controlling directly an image which is projected after passing through a projection lens.

Furthermore, to use aspheric surface is a means for correcting aberrations. By replacing a plurality of spherical lenses by one aspheric lens, it is possible to downsize an optical system while maintaining performance thereof.

Meanwhile, an aspheric lens is required to have high precision in component and assembly, and thus if many aspheric lenses are used, problems arise in that difficulty in manufacture increases, and small lot production causes disadvantage in cost.

Accordingly, in an actual lens design, it is necessary to develop a lens configuration capable of obtaining high optical performance required for projection lenses while satisfying various requirements such as a decrease in size, reduction in cost, and mass productivity.

The present invention has been made in consideration of the above-mentioned situation, and its object is to provide a projection lens system capable of obtaining high optical performance while satisfying requirements such as a decrease in size, reduction in cost, and mass productivity required for recent projections lenses, and to provide a projection type display apparatus using the projection lens system.

SUMMARY

According to an aspect of the invention, a projection zoom lens system includes, in order from a magnification side: a first lens group having a negative refractive power; a second lens group having a positive refractive power; a third lens group having a positive refractive power; a fourth lens group having a positive refractive power; and a fifth lens group having a positive refractive power.

In the lens system, the first lens group has an aspheric surface, a lens closest to the magnification side in the fourth lens group has an aspheric surface, and the fifth lens group consists of one positive lens.

Furthermore, during zooming, the first and fifth lens groups remain stationary, while the second, third, and fourth lens groups are movable respectively, and during zooming from a wide-angle end to a telephoto end, the second, third, and fourth lens groups are moved toward the magnification side along an optical axis.

Further, the lens system satisfies the following conditional expression (1):

$$0.8 < d34/fw \qquad (1),$$

where fw denotes a focal length of the whole system at the wide-angle end, and d34 denotes an air space between the third lens group and the fourth lens group at the wide-angle end.

In this case, it is preferred that the fourth lens group include, in order from the magnification side: a negative lens having a concave surface directed toward the magnification side; a cemented lens formed by cementing a negative lens having a concave surface directed toward the magnification side and a positive lens having a convex surface directed toward a reduction side; and a positive lens having a convex surface directed toward the reduction side. Furthermore, it is more preferred that a negative lens be located on the magnification side in the cemented lens.

Further, it is preferred that a magnification-side surface of the aspheric lens located closest to the magnification side in the fourth lens group be formed as a curved surface located closer to the reduction side than a spherical surface, which comes into contact with the magnification-side surface on the optical axis and has the same algebraic sign and the same curvature as the magnification-side surface, in an area out of the optical axis.

Furthermore, it is preferred that the projection zoom lens system satisfies the following conditional expressions (2) to (4):

$$0 < |d/fw| < 1.00 \quad (2),$$

$$1.75 < ndp \quad (3), \text{ and}$$

$$1.75 < ndn \quad (4),$$

where d denotes a distance from a magnification-side focal point of the composite lens group of the fourth lens group and the fifth lens group at the wide-angle end to a vertex of the magnification-side surface of the lens located closest to the magnification side in the fourth lens group, ndp denotes an average of refractive indices of the positive lenses in the second lens group at the d-line, and ndn denotes an average of refractive indices of the negative lenses in the fourth lens group at the d-line.

Further, it is preferred that the lens closest to the magnification side in the first lens group be a negative meniscus lens having a convex surface directed toward the magnification side, and it is also preferred that a reduction-side surface of the negative meniscus lens be aspheric.

In addition, in this case, it is preferred that the lens closest to the magnification side in the first lens group be a compound aspheric lens having a resin layer which is formed on a surface of a glass lens and a surface of the resin layer on a side opposite to the glass lens is aspheric.

According to another aspect of the invention, a projection type display apparatus: a light source; a light valve; an illumination optical unit guiding rays originated from the light source into the light valve; and any one of the projection zoom lens systems mentioned above. In the apparatus, the rays originated from the light source are optically modulated by the light valve, and are projected on a screen by the projection zoom lens system.

Furthermore, in the above description, the "magnification side" means a projection plane side (a final image side), and the "reduction side" means a light source side (an original image side).

According to the aspects of the invention, the projection zoom lens system is configured such that the whole lens system is divided into the fifth groups of negative-positive-positive-positive-positive refractive power in the order from the magnification side, three lens groups located on the middle of the system is movable during zooming, the first lens group has an aspheric surface, the lens closest to the magnification side in the fourth lens group has an aspheric surface, and the fifth lens group is formed of one positive lens. Furthermore, the projection zoom lens system is configured such that the conditional expression (1) is satisfied, and the air space between the third lens group and the fourth lens group at the wide-angle end is set by a value or more.

Accordingly, it is possible to appropriately divide lens power, to efficiently dispose an aspheric surface for correcting aberrations, and to satisfactorily correct various aberrations by use of a small number of aspheric lenses. In particular, the fourth lens group has a positive refractive power, and the lens group includes a large air space provided on the magnification side of the lens provided with the aspheric surface. Hence, it is possible to arrange the lens closest to the magnification side as a concave lens in the whole system, to very satisfactorily balance various aberrations while satisfactorily correcting distortion, and to form a small-sized, fast, and wide-angle zoom lens system regardless of having a variable power ratio of 1.2 times or so.

DETAILED DESCRIPTION

Figure 1:
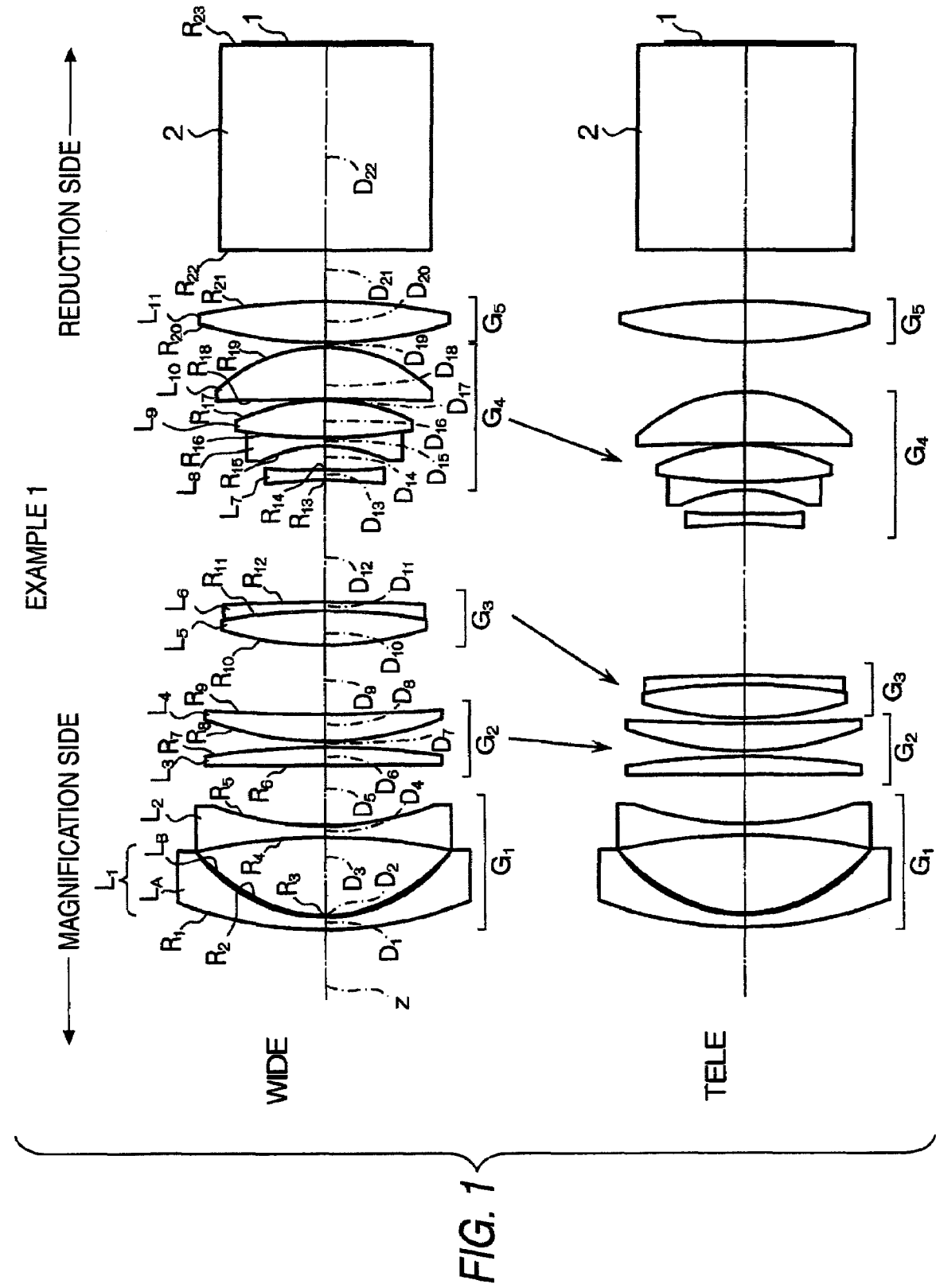
FIG. 1 is a schematic diagram showing a configuration at a wide-angle end (WIDE) and a telephoto end (TELE) of a projection zoom lens system according to Example 1 of the invention.

Hereinafter, embodiments of the invention will be described in detail with reference to the drawings. According to an embodiment (which shows a representative configuration according to Example 1) shown in FIG. 1, the projection zoom lens system is configured to include, in order from a magnification side: a first lens group $G_1$ having a negative refractive power; and each of a second lens group $G_2$ to a fifth lens group $G_5$ having a positive refractive power, and to be nearly telecentric on a reduction side. In addition, in the subsequent stage thereof, there are also arranged a glass block 2 (which includes filter portion) mostly using a color synthesizing prism and an image display surface 1 as a light valve such as a liquid crystal display panel. In addition, the reference sign z in the drawing represents an optical axis.

Here, the first lens group $G_1$ includes: a first lens $L_1$ formed as an aspheric lens (a compound aspheric lens in examples) having a convex surface directed toward the magnification side; and a second lens $L_2$ formed as a negative lens. Furthermore, the second lens group $G_2$ includes: a third lens $L_3$ formed as a positive lens; and a fourth lens $L_4$ formed as a positive lens. Further, the third lens group $G_3$ includes a cemented lens formed by cementing a fifth lens $L_5$ formed as a positive lens and a sixth lens $L_6$ formed as a negative lens. In addition, the fourth lens group $G_4$ includes, in order from the magnification side: a seventh lens $L_7$ formed as an aspheric negative lens (in the following examples, it has a negative refractive power at least near the optical axis) having a concave surface directed toward the magnification side; a cemented lens formed by cementing an eighth lens $L_8$ formed as a negative lens having a concave surface directed toward the magnification side and a ninth lens $L_9$ formed as a positive lens having a convex surface directed toward the reduction side; and a tenth lens $L_{10}$ formed as a positive lens. Moreover, the fifth lens group $G_5$ includes only an eleventh lens $L_{11}$ formed as a positive lens.

Furthermore, it is preferred that the first lens $L_1$ closest to the magnification side in the first lens group $G_1$ be formed as a negative meniscus lens having a convex surface directed toward the magnification side, and the reduction-side surface of the first lens $L_1$ be aspheric. As described above, by disposing an aspheric lens to be closest to the magnification side in the first lens group $G_1$, it is possible to separately correct distortion for each angle of view. Therefore, it is possible to correct aberrations efficiently, and it is also possible to downsize the lens system.

Further, by forming the first lens $L_1$ as a compound aspheric lens in which a resin layer is formed on a glass lens surface thereof and a surface of the resin layer on a side opposite to the glass lens is aspheric, it is possible to further promote improvement in efficiency of the above-mentioned distortion correction and reduction in size of the lens system.

Figure 2:
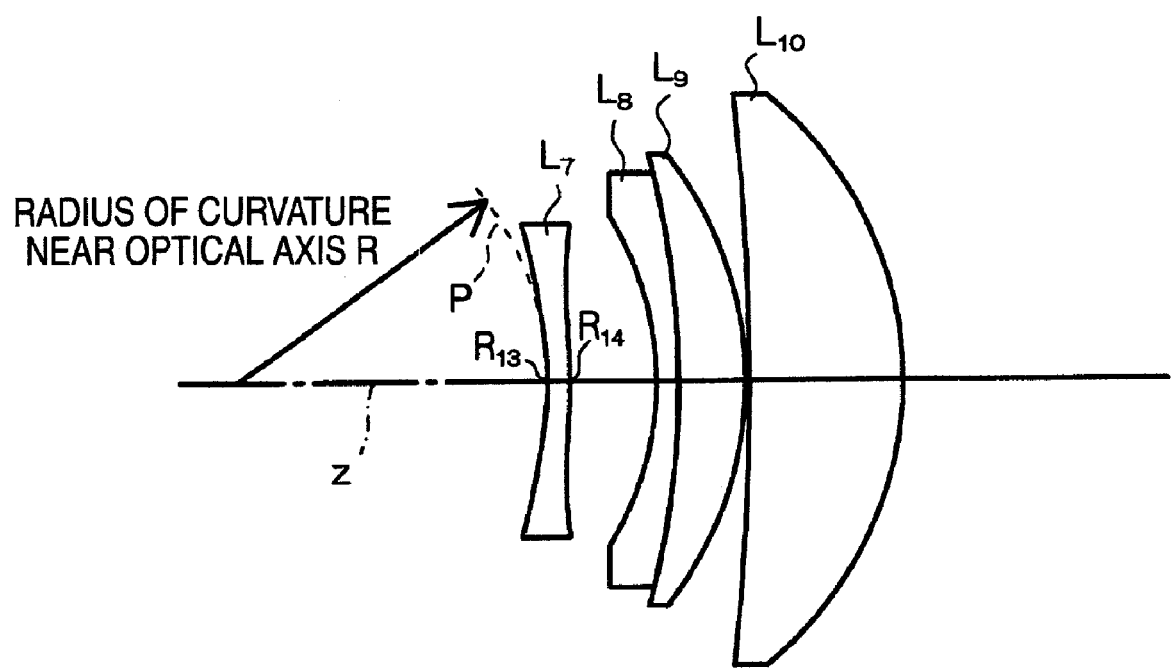
FIG. 2 is a schematic diagram explaining an aspheric shape of the magnification side of an aspheric lens (a seventh lens $L_7$) located closest to the magnification side in the fourth lens group $G_4$.

Furthermore, it is preferred that both surfaces of the seventh lens $L_7$, which is formed as an aspheric lens located closest to the magnification side in the fourth lens group $G_4$, be aspheric. It is also preferred that, as shown in FIG. 2, the magnification-side surface thereof be formed as a curved surface located closer to the reduction side than a spherical surface P in an area out of the optical axis z the spherical surface P comes into contact with the surface on the optical axis z and has the same algebraic sign and the same curvature ($R_{13}$) as the surface. As described above, by designing the magnification-side aspheric surface of the seventh lens $L_7$ to be closer to the reduction side than the spherical surface P, it is possible to more satisfactorily correct spherical aberration.

Further, it is preferred that the fourth lens group $G_4$ include, in order from the magnification side: a cemented lens formed by cementing a negative aspheric lens (which is the seventh lens $L_7$ in the examples) having a concave surface directed toward the magnification side, a negative lens having a concave surface directed toward the magnification side (which is the eighth lens $L_8$ in the examples), and a positive lens having a convex surface directed toward the reduction side (which is the ninth lens $L_9$ in the examples); and a positive lens having a convex surface directed toward the reduction side (which is the tenth lens $L_{10}$ in the examples). By designing the fourth lens group $G_4$ based on such a configuration, it becomes advantageous to correct spherical aberration, it also becomes advantageous to correct longitudinal or lateral chromatic aberration, and it becomes easy to secure telecentricity on the reduction side of the whole system.

Furthermore, the projection zoom lens system according to the embodiment is configured to have a zoom function performed by moving the three lens groups $G_2$, $G_3$, and $G_4$ in a direction of the optical axis z during zooming. In this manner, by setting the three lens groups of the second lens group $G_2$, the third lens group $G_3$, and the fourth lens group $G_4$ as movable groups during zooming, it is possible to more satisfactorily correct aberrations.

Further, during zooming from the wide-angle end to the telephoto end, it is preferred that the all movable lens groups be configured to move to the magnification side. With such a configuration according to the embodiment, it is possible to set a variable power ratio as a large value.

However, this means that, in each movable lens group, its position at the telephoto end is set closer to the magnification side than its position at the wide-angle end, and does not exclude that its position is temporarily moved to the reduction side at the intermediate region.

Further, generally, focus adjustment is performed by moving the first lens group $G_1$ in the optical-axis direction.

Furthermore, a speed of the projection zoom lens system according to the embodiment is determined depending on a structural frame shape between the third lens group $G_3$ and the fourth lens group $G_4$ when zooming is performed. However, a speed of the lens may be adjusted by appropriately disposing an aperture diaphragm (which can be replaced by a mask) on a predetermined position.

Further, the projection zoom lens system according to the embodiment is configured to satisfy the following conditional expression (1), and preferably satisfies the following conditional expressions (2) to (4):

$$0.8 < d34/fw \qquad (1),$$

$$0 < |d/fw| < 1.00 \qquad (2),$$

$$1.75 < ndp \qquad (3), \text{ and}$$

$$1.75 < ndn \qquad (4),$$

where fw denotes a focal length of the whole system at the wide-angle end, d34 denotes an air space between the third lens group $G_3$ and the fourth lens group $G_4$ at the wide-angle end, d denotes a distance from a magnification-side focal point of the complex lens group of the fourth lens group $G_4$ and the fifth lens group $G_5$ at the wide-angle end to a vertex of the magnification-side surface of the lens located closest to the magnification side in the fourth lens group $G_4$, ndp denotes an average of refractive indices of the positive lenses in the second lens group $G_2$ at the d-line, and ndn denotes an average of refractive indices of the negative lenses in the fourth lens group $G_4$ at the d-line.

Now, the technical spirit of the conditional expressions (1) to (4) mentioned above will be described.

First, the conditional expression (1) defines a ratio of the air space between the third lens group $G_3$ and the fourth lens group $G_4$ at the wide-angle end to the focal length of the whole system at the wide-angle end, and is a conditional expression for satisfactorily correcting distortion. When the lower limit of the conditional expression (1) is exceeded, negative distortion increases, and it becomes a factor causing deterioration in pincushion distortion on the magnification side.

Furthermore, by setting the following conditional expression (1') to be satisfied instead of the conditional expression (1), it is possible to improve the above-mentioned effect.

$$0.8 < d34/fw < 1.3 \quad (1')$$

Further, the conditional expression (2) is a conditional expression for appropriately defining a position of a pupil based on a lens design. When the range of the conditional expression (2) is exceeded, it becomes difficult to effectively correct spherical aberration by use of the aspheric surfaces in the fourth lens group $G_4$.

Furthermore, by setting the following conditional expression (2') to be satisfied instead of the conditional expression (2), it is possible to improve the effect of the conditional expression (2).

$$0.30 < |d/fw| < 0.70 \quad (2')$$

Further, by setting the following conditional expression (2") to be satisfied instead of the conditional expression (2'), it is possible to improve the effect of the conditional expression (2).

$$0.45 < |d/fw| < 0.60 \quad (2'')$$

Furthermore, the conditional expression (3) defines an average of the refractive indices of the positive lenses in the second lens group $G_2$ at the d-line, and is a conditional expression for satisfactorily correcting field curvature.

When the lower limit of the conditional expression (3) is exceeded, Petzval sum increases, and it becomes a factor causing a tilt of the image plane.

Further, the conditional expression (4) defines an average of the refractive indices of the respective lenses in the fourth lens group $G_4$ at the d-line, and is a conditional expression for satisfactorily correcting spherical aberration and chromatic aberration. When the lower limit of the conditional expression (4) is exceeded, it becomes difficult to satisfactorily correct spherical aberration and chromatic aberration.

Here, each of the projection zoom lens systems according to the following examples includes an aspheric lens, and the aspheric shape is expressed by the following aspheric expression.

$$Z = \frac{Y^2/R}{1+\sqrt{1-K \times Y^2/R^2}} + \sum_{i=3}^{16} A_i Y^i \quad \text{[Numerical Expression 1]}$$

where

Z denotes a length of a perpendicular from a point on an aspheric surface, which is apart from the optical axis at a distance Y, to a tangential plane (a plane perpendicular to the optical axis) of the vertex of the aspheric surface, Y denotes a distance from the optical axis, R denotes a radius of curvature near the optical axis of an aspheric surface, K denotes an eccentricity, and $A_i$ denotes an aspheric coefficient (i=3 to 16).

Figure 10:
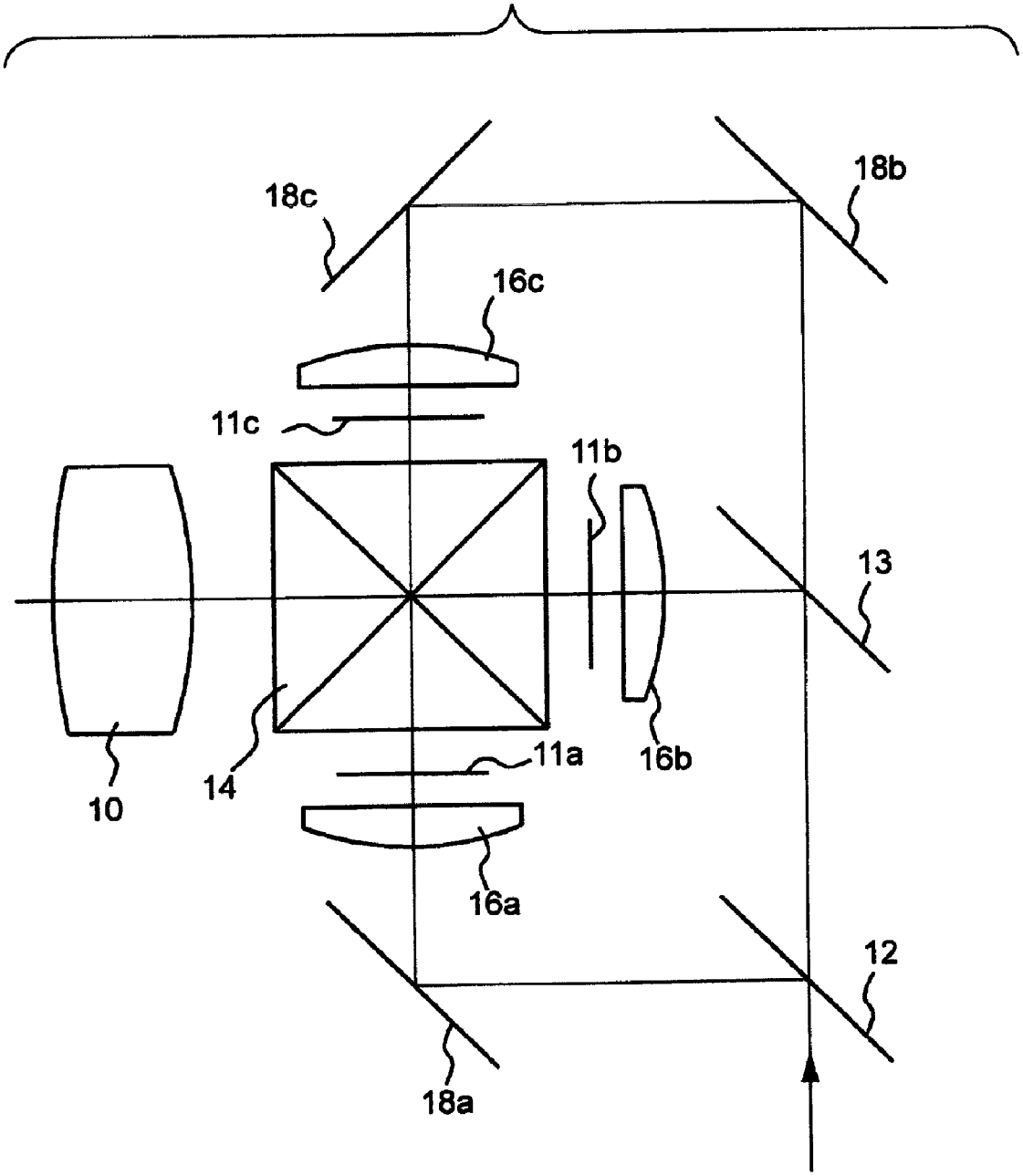
FIG. 10 is a schematic diagram showing a configuration of a projection type display apparatus according to an embodiment of the invention.
Figure 10:
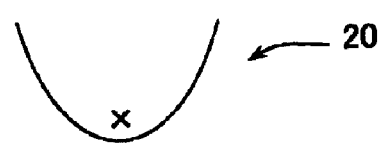

Next, an example of the projection type display apparatus equipped with the aforementioned projection zoom lens system will be described with reference to FIG. 10. The projection type display apparatus shown in FIG. 10 has transmissive liquid crystal panels 11a to 11c as light valves, and employs the aforementioned projection zoom lens system according to the embodiment as a projection zoom lens system 10. Furthermore, between a light source 20 and a dichroic mirror 12, there is disposed an integrator (not shown in the drawing) such as fly-eye. From the light source 20, white rays travel through an illumination optical unit, are modulated by being incident on the liquid crystal panels 11a to 11c which correspond to three color rays (G light, B light, R light), are color-synthesized by a cross dichroic prism 14, and are projected by the projection zoom lens system 10 on a screen not shown in the drawing. The device includes dichroic mirrors 12 and 13 for color separation, a cross dichroic prism 14 for color synthesis, condenser lenses 16a to 16c, and total reflection mirrors 18a to 18c. The projection type display apparatus of the embodiment employs the projection zoom lens system according to the embodiment, and thus it is possible to embody a projection type display apparatus having a wide angle, good projection image quality, high brightness, and a compact size.

Further, the projection zoom lens system according to the embodiments of the invention is not limited to applications serving as a projection zoom lens system of the projection type display apparatus using a transmissive liquid crystal display panel, and may be applied to a projection zoom lens system of a device using a different optical modulator such as reflective liquid crystal display panel or DMD.

EXAMPLES

Hereinafter, the projection zoom lens system according to the invention will be further described with reference to specific examples.

Example 1

The projection zoom lens system according to Example 1 has a configuration shown in FIG. 1 as described above. Specifically, in the projection zoom lens system, in order from the magnification side, the first lens group $G_1$ includes: a first lens $L_1$ formed as a compound aspheric lens in which a resin layer $L_B$ is formed on a reduction side of a glass lens $L_A$ having a negative meniscus shape having a concave surface directed toward the reduction side and the reduction-side surface of the resin layer $L_B$ is aspheric; and a second lens $L_2$ formed as a biconcave lens. Furthermore, the second lens group $G_2$ includes: a third lens $L_3$ formed as a plano-convex lens having a convex surface directed toward the reduction side; and a fourth lens $L_4$ formed as a positive meniscus lens having a convex surface directed toward the magnification side. Further, the third lens group $G_3$ includes a cemented lens formed by cementing a fifth lens $L_5$ formed as a biconvex lens and a sixth lens $L_6$ formed as a negative meniscus lens having a convex surface directed toward the reduction side. Furthermore, the fourth lens group $G_4$ includes in order from the magnification side: a seventh lens $L_7$ formed as a bi-aspheric negative lens having a concave surface directed toward the magnification side; a cemented lens formed by cementing an eighth lens $L_8$ formed as a biconcave lens and a ninth lens $L_9$ formed as a biconvex lens; and a tenth lens $L_{10}$ formed as a positive meniscus lens having a convex surface directed toward the reduction side. Further, the fifth lens group $G_5$ includes only an eleventh lens $L_{11}$ formed as a biconvex lens.

Furthermore, in the seventh lens $L_7$ of which both surfaces are aspheric in the fourth lens group $G_4$, the magnification-side surface thereof is, as described above with reference to FIG. 2, formed as a curved surface located closer to the reduction side than a spherical surface P, which comes into contact with the surface on the optical axis z and has the same algebraic sign and the same curvature ($R_{13}$) as the surface, in an area out of the optical axis z.

Further, during zooming, as accompanied with movement from the wide-angle end to the telephoto end, the second lens group $G_2$, the third lens group $G_3$ and the fourth lens group $G_4$ are moved independently of each other toward the magnification side (see the zooming locus shown in FIG. 1 (hereinafter, the same in the following examples shown in FIGS. 2 to 4)).

In the example, the upper part of Table 1 shows an R (mm) which is a radius of curvature of each lens surface according to Example 1, a D (mm) which is a center thickness of each lens and an air space between lenses, an Nd which is a refractive index of each lens at the d-line, and a vd which is an Abbe number of each lens at the d-line. Furthermore, in the Table 1 and the Tables 2 to 4 to be described later, each numeral corresponding to each of the reference signs R, D, Nd, and vd sequentially increases in order from the magnification side.

Further, the top of the Table 1 shows a focal length f (the wide-angle end to the telephoto end), a back focal length Bfw at the wide-angle end, F number Fno. (the wide-angle end to the telephoto end), and angle of view 2ω (the wide-angle end to the telephoto end). The lower part of Table 1 shows respective constants K and $A_3$ to $A_{16}$ corresponding to the respective aspheric surfaces.

TABLE 1 f = 16.11~19.34
Bfw = 26.82
Fno = 1.58~1.68
2ω = 73.80°~63.40°

| SNo. | R | D | Nd | vd |
|---|---|---|---|---|
| 1 | 56.202 | 1.80 | 1.80610 | 33.3 |
| 2 | 21.915 | 0.20 | 1.52771 | 41.8 |
| *3 | 18.770 | 11.37 | | |
| 4 | −82.100 | 1.60 | 1.60311 | 60.6 |
| 5 | 43.632 | 8.74~7.11 | | |
| 6 | ∞ | 2.66 | 1.84666 | 23.8 |
| 7 | −109.769 | 0.83 | | |
| 8 | 44.807 | 4.00 | 1.80610 | 33.3 |
| 9 | 257.259 | 10.00~0.79 | | |
| 10 | 47.963 | 4.94 | 1.77250 | 49.6 |
| 11 | −80.747 | 1.30 | 1.84666 | 23.8 |
| 12 | −260.090 | 17.67~21.96 | | |
| *13 | −35.463 | 1.50 | 1.80348 | 40.4 |
| *14 | −91.420 | 3.40 | | |
| 15 | −20.139 | 1.20 | 1.84666 | 23.8 |
| 16 | 73.277 | 5.33 | 1.60311 | 60.6 |
| 17 | −28.351 | 0.20 | | |
| 18 | −419.250 | 7.45 | 1.65160 | 58.4 |
| 19 | −21.985 | 0.67~7.20 | | |
| 20 | 60.168 | 5.88 | 1.71300 | 53.9 |
| 21 | −86.518 | 7.40 | | |
| 22 | ∞ | 29.50 | 1.51680 | 64.2 |
| 23 | ∞ | | | |

ASPHERIC COEFFICIENT

| | SNo. | | |
|---|---|---|---|
| | 3rd surface | 13rd surface | 14th surface |
| K | 0.0000000 | 0.0000000 | 0.0000000 |
| $A_3$ | 9.4476662E−05 | −8.8916749E−06 | 0.0000000 |
| $A_4$ | −3.3718444E−05 | 2.0211876E−04 | 2.1914439E−04 |

TABLE 1-continued

| $A_5$ | 1.7265749E−06 | −4.0270038E−06 | 0.0000000 |
|---|---|---|---|
| $A_6$ | −7.9742186E−08 | −8.7660625E−07 | −1.2581507E−06 |
| $A_7$ | −3.0651678E−09 | −5.3265939E−08 | −2.7649056E−08 |
| $A_8$ | 9.9463611E−11 | 1.8955312E−10 | 1.8048479E−09 |
| $A_9$ | 1.0002179E−11 | 1.9909609E−10 | 2.5992753E−10 |
| $A_{10}$ | 9.5003936E−14 | 3.9322732E−11 | 1.4213550E−11 |
| $A_{11}$ | −3.7425556E−14 | 3.4561543E−12 | 4.9198274E−14 |
| $A_{12}$ | −2.9784496E−15 | 2.7767448E−14 | −1.2853149E−13 |
| $A_{13}$ | −5.0519018E−17 | −3.6674209E−14 | −1.3847118E−14 |
| $A_{14}$ | 1.1148368E−17 | −6.3815813E−15 | −7.2736530E−16 |
| $A_{15}$ | 1.0482055E−18 | −3.9620487E−16 | 3.7738310E−17 |
| $A_{16}$ | −6.3223870E−20 | 9.2752815E−17 | 1.5878413E−17 |

*Aspheric surface
SNo.: Surface number

In addition, Table 5 shows numerical values corresponding to the conditional expressions (1) to (4) according to Example 1.

Figure 6:
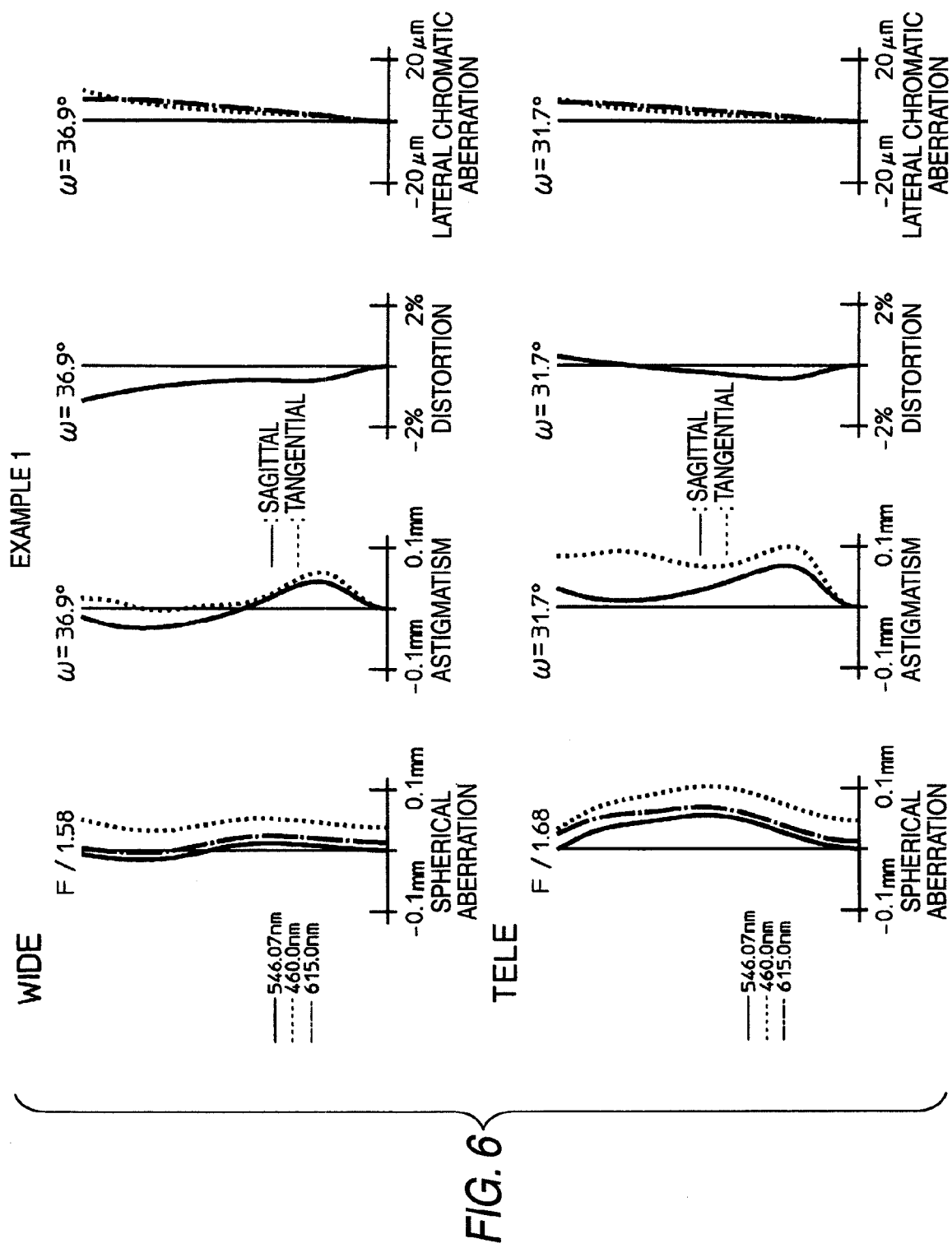
FIG. 6 is an aberration diagram showing various aberrations (spherical aberration, astigmatism, distortion, and lateral chromatic aberration) of the projection zoom lens system according to Example 1.

FIG. 6 is an aberration diagram illustrating various aberrations (spherical aberration, astigmatism, distortion, and lateral chromatic aberration) at the wide-angle end (WIDE) and the telephoto end (TELE) of the projection zoom lens system according to Example 1. Furthermore, in FIGS. 6 and 7 to 9 to be described later, the spherical aberration diagrams show aberration curves of rays having wavelengths of 546.07 nm, 460.0 nm, and 615.0 nm, the astigmatism diagrams show aberration curves of a sagittal image plane and a tangential image plane, and the lateral chromatic aberration diagrams show aberration curves of rays having wavelengths 460.0 nm and 615.0 nm when the wavelength of 546.07 nm is a reference wavelength.

As can be seen clearly from FIG. 6, the projection zoom lens system according to Example 1 is a wide-angle lens having an angle of view 2ω of 73.8 degrees at the wide-angle end and is a fast lens having an F number of 1.58 at the wide-angle, in which aberrations are satisfactorily corrected.

Further, as shown in Table 5, the projection zoom lens system according to Example 1 satisfies the conditional expressions (1) to (4), and also satisfies the conditional expressions (1'), (2'), and (2").

Furthermore, a distance from a surface closest to the magnification side (a first surface) to a screen is 1280 mm (hereinafter the same in the following examples).

Example 2

Figure 3:
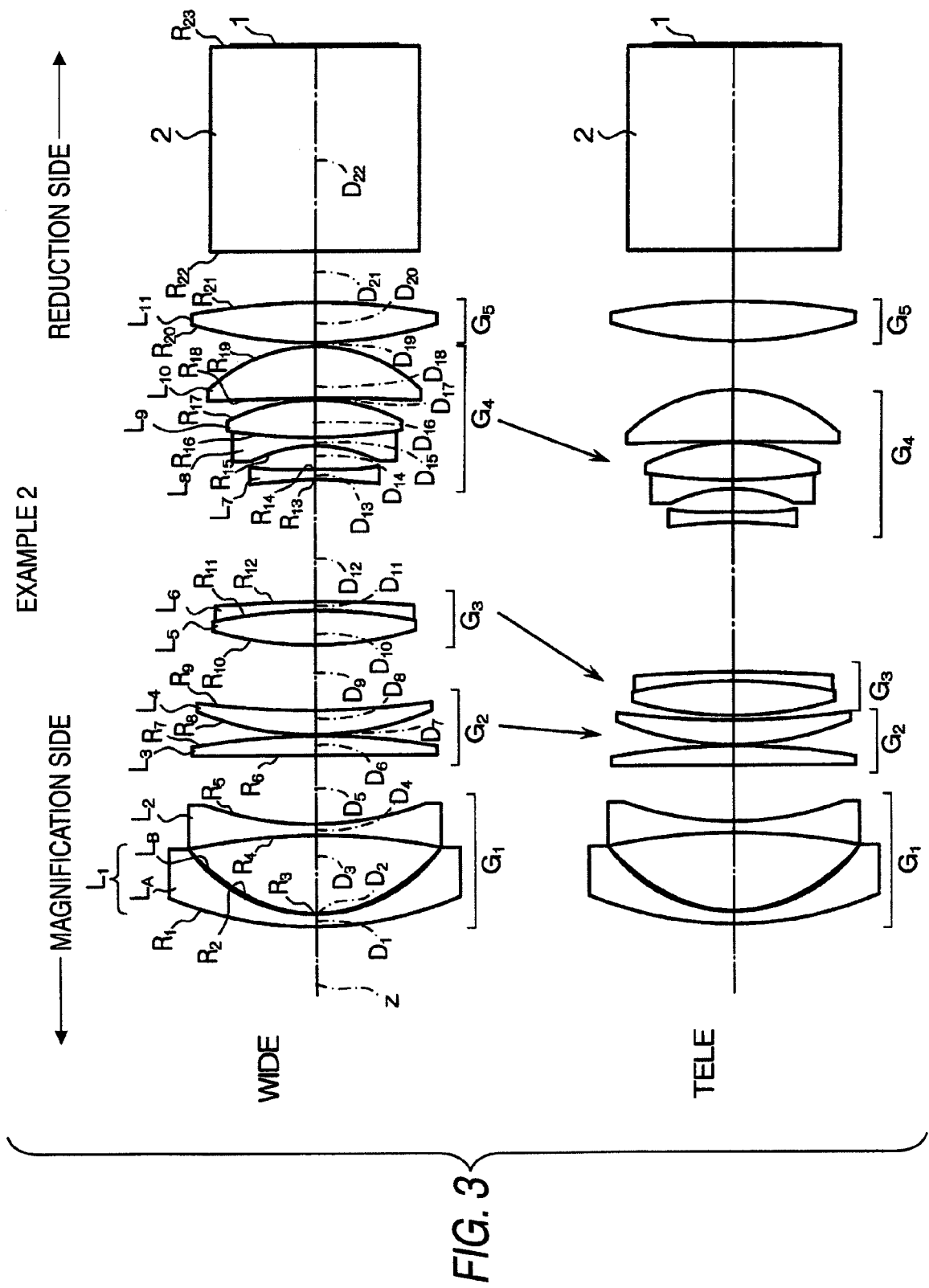
FIG. 3 is a schematic diagram showing a configuration at the wide-angle end (WIDE) and the telephoto end (TELE) of a projection zoom lens system according to Example 2 of the invention.

FIG. 3 shows a schematic configuration of the projection zoom lens system according to Example 2. Since the projection zoom lens system of Example 2 has substantially the same configuration as that of Example 1, only data thereof will be described, and detailed description thereof will be omitted.

In Example 2, the upper part of Table 2 shows an R which is a radius of curvature of each lens surface according to the example, a D which is a center thickness of each lens and an air space between lenses, an Nd which is a refractive index of each lens at the d-line, and a vd which is an Abbe number of each lens at the d-line.

Further, the top of the Table 2 shows a focal length f (the wide-angle end to the telephoto end), a back focal length Bfw at the wide-angle end, F number Fno. (the wide-angle end to the telephoto end), and angle of view 2ω (the wide-angle end to the telephoto end). The lower part of Table 2 shows respective constants K and $A_3$ to $A_{16}$ corresponding to the respective aspheric surfaces.

TABLE 2 f = 16.13~19.35
Bfw = 26.82
Fno = 1.58~1.68
2ω = 74.00°~63.20°

| SNo. | R | D | Nd | νd |
|---|---|---|---|---|
| 1 | 52.786 | 1.80 | 1.80610 | 33.3 |
| 2 | 21.683 | 0.08 | 1.52771 | 41.8 |
| *3 | 18.725 | 11.40 | | |
| 4 | −88.158 | 1.60 | 1.60311 | 60.6 |
| 5 | 44.638 | 10.02~8.20 | | |
| 6 | ∞ | 2.83 | 1.84666 | 23.8 |
| 7 | −98.895 | 0.20 | | |
| 8 | 41.998 | 3.59 | 1.80610 | 33.3 |
| 9 | 122.121 | 9.45~0.69 | | |
| 10 | 51.050 | 5.03 | 1.77250 | 49.6 |
| 11 | −67.926 | 1.30 | 1.84666 | 23.8 |
| 12 | −174.168 | 17.63~21.75 | | |
| *13 | −35.017 | 1.50 | 1.80348 | 40.4 |
| *14 | −93.057 | 3.40 | | |
| 15 | −19.601 | 1.20 | 1.84666 | 23.8 |
| 16 | 76.886 | 5.43 | 1.60311 | 60.6 |
| 17 | −27.009 | 0.20 | | |
| 18 | −345.777 | 7.42 | 1.65160 | 58.4 |
| 19 | −21.821 | 0.59~7.05 | | |
| 20 | 58.875 | 5.76 | 1.71300 | 53.9 |
| 21 | −93.946 | 7.40 | | |
| 22 | ∞ | 29.50 | 1.51680 | 64.2 |
| 23 | ∞ | | | |

ASPHERIC COEFFICIENT

| | SNo. | | |
|---|---|---|---|
| | 3rd surface | 13rd surface | 14th surface |
| K | 0.0000000 | 0.0000000 | 0.0000000 |
| $A_3$ | 9.2611113E−05 | −5.5767565E−06 | 0.0000000 |
| $A_4$ | −3.2210461E−05 | 2.0242095E−04 | 2.1988147E−04 |
| $A_5$ | 1.7526437E−06 | −4.2191169E−06 | 0.0000000 |
| $A_6$ | −8.0129966E−08 | −8.9223906E−07 | −1.2949358E−06 |
| $A_7$ | −3.0755480E−09 | −5.4145676E−08 | −2.8892279E−08 |
| $A_8$ | 1.0051556E−10 | 1.3351071E−10 | 1.8084925E−09 |
| $A_9$ | 1.0080899E−11 | 1.9573862E−10 | 2.6348658E−10 |
| $A_{10}$ | 9.7871354E−14 | 3.9334383E−11 | 1.4594705E−11 |
| $A_{11}$ | −3.7334970E−14 | 3.5010492E−12 | 8.0948966E−14 |
| $A_{12}$ | −2.9733503E−15 | 3.5504609E−14 | −1.2338114E−13 |
| $A_{13}$ | −4.9902734E−17 | −3.5949533E−14 | −1.2909348E−14 |
| $A_{14}$ | 1.1190428E−17 | −6.3466711E−15 | −6.0826481E−16 |
| $A_{15}$ | 1.0479534E−18 | −3.9797372E−16 | 4.2713276E−17 |
| $A_{16}$ | −6.3763788E−20 | 9.2241979E−17 | 1.3409493E−17 |

*Aspheric surface
SNo.: Surface number

In addition, Table 5 shows numerical values corresponding to the conditional expressions according to Example 2.

Figure 7:
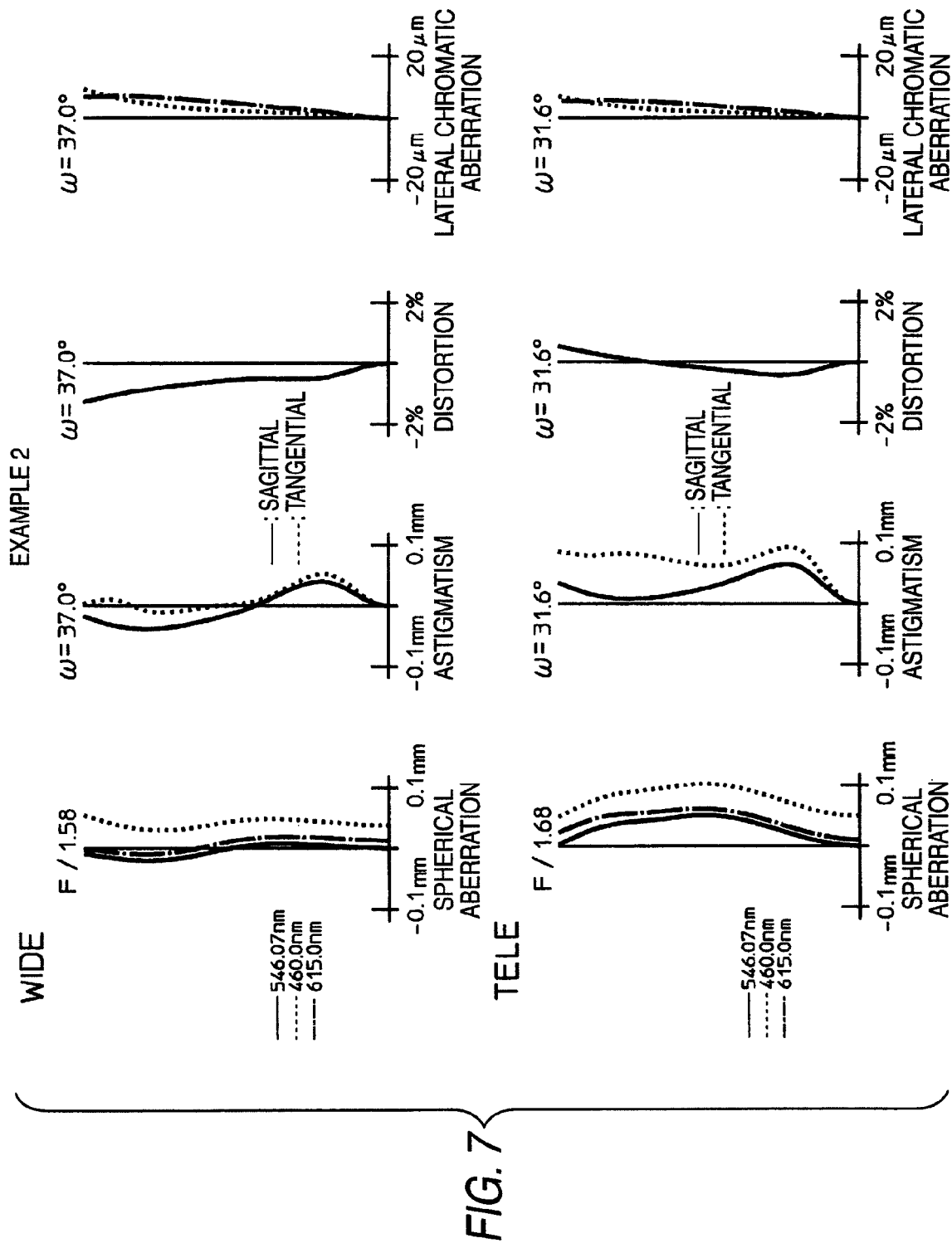
FIG. 7 is an aberration diagram showing various aberrations (spherical aberration, astigmatism, distortion, and lateral chromatic aberration) of the projection zoom lens system according to Example 2.

FIG. 7 is an aberration diagram illustrating various aberrations (spherical aberration, astigmatism, distortion, and lateral chromatic aberration) at the wide-angle end (WIDE) and the telephoto end (TELE) of the projection zoom lens system according to Example 2.

As can be seen clearly from FIG. 7, the projection zoom lens system according to Example 2 is a wide-angle lens having an angle of view 2ω of 74.0 degrees at the wide-angle end and is a fast lens having an F number of 1.58 at the wide-angle, in which aberrations are satisfactorily corrected.

Further, as shown in Table 5, the projection zoom lens system according to Example 2 satisfies the conditional expressions (1) to (4), and also satisfies the conditional expressions (1'), (2'), and (2").

Example 3

Figure 4:
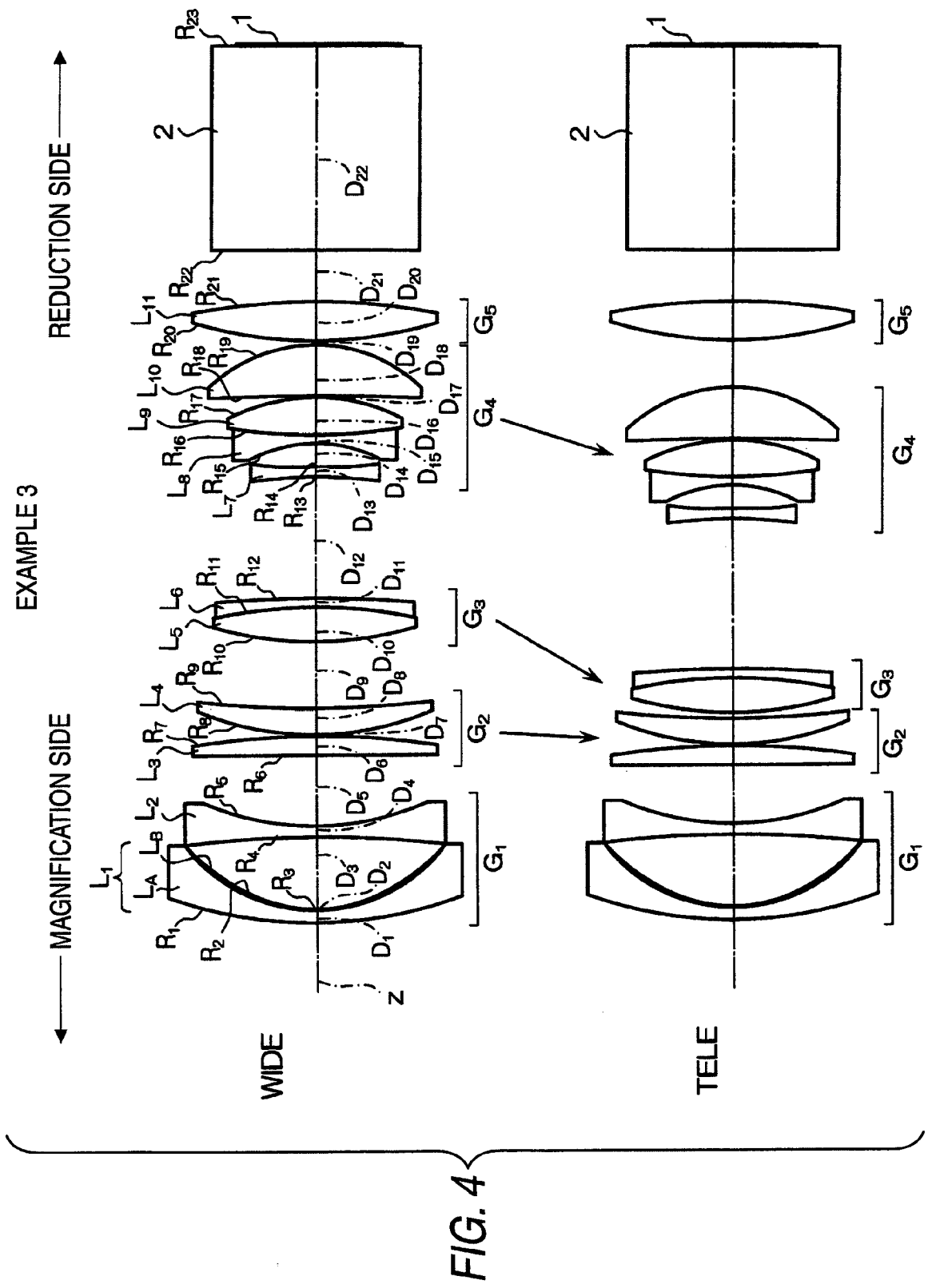
FIG. 4 is a schematic diagram showing a configuration at the wide-angle end (WIDE) and the telephoto end (TELE) of a projection zoom lens system according to Example 3 of the invention.

FIG. 4 shows a schematic configuration of the projection zoom lens system according to Example 3. Since the projection zoom lens system of Example 3 has substantially the same configuration as that of Example 1, only data thereof will be described, and detailed description thereof will be omitted.

In Example 3, the upper part of Table 3 shows an R which is a radius of curvature of each lens surface according to the example, a D which is a center thickness of each lens and an air space between lenses, an Nd which is a refractive index of each lens at the d-line, and a νd which is an Abbe number of each lens at the d-line.

Further, the top of the Table 3 shows a focal length f (the wide-angle end to the telephoto end), a back focal length Bfw at the wide-angle end, F number Fno. (the wide-angle end to the telephoto end), and angle of view 2ω (the wide-angle end to the telephoto end). The lower part of Table 3 shows respective constants K and $A_3$ to $A_{16}$ corresponding to the respective aspheric surfaces.

TABLE 3 f = 16.11~19.33
Bfw = 26.82
Fno = 1.58~1.67
2ω = 74.00°~63.20°

| SNo. | R | D | Nd | νd |
|---|---|---|---|---|
| 1 | 60.312 | 1.80 | 1.77250 | 49.6 |
| 2 | 22.846 | 0.14 | 1.52771 | 41.8 |
| *3 | 19.609 | 10.62 | | |
| 4 | −153.476 | 1.60 | 1.65160 | 58.4 |
| 5 | 39.032 | 10.04~8.56 | | |
| 6 | ∞ | 2.84 | 1.84666 | 23.8 |
| 7 | −112.135 | 0.20 | | |
| 8 | 42.317 | 3.82 | 1.80610 | 40.9 |
| 9 | 143.308 | 9.63~0.84 | | |
| 10 | 51.027 | 5.03 | 1.77250 | 49.6 |
| 11 | −67.851 | 1.30 | 1.84666 | 23.8 |
| 12 | −174.088 | 17.66~21.92 | | |
| *13 | −35.023 | 1.50 | 1.80348 | 40.4 |
| *14 | −93.034 | 3.41 | | |
| 15 | −19.613 | 1.20 | 1.84666 | 23.8 |
| 16 | 76.956 | 5.43 | 1.60311 | 60.6 |
| 17 | −26.981 | 0.20 | | |
| 18 | −345.384 | 7.43 | 1.65160 | 58.4 |
| 19 | −21.847 | 0.58~6.89 | | |
| 20 | 58.873 | 5.72 | 1.72000 | 43.7 |
| 21 | −93.957 | 7.40 | | |
| 22 | ∞ | 29.50 | 1.51680 | 64.2 |
| 23 | ∞ | | | |

ASPHERIC COEFFICIENT

| | SNo. | | |
|---|---|---|---|
| | 3rd surface | 13rd surface | 14th surface |
| K | 0.0000000 | 0.0000000 | 0.0000000 |
| $A_3$ | 1.0483666E−04 | −5.3599580E−06 | 0.0000000 |
| $A_4$ | −3.5528325E−05 | 2.0243816E−04 | 2.1986913E−04 |
| $A_5$ | 2.2543538E−06 | −4.2174867E−06 | 0.0000000 |
| $A_6$ | −9.4596150E−08 | −8.9207677E−07 | −1.2950452E−06 |
| $A_7$ | −3.2670138E−09 | −5.4129309E−08 | −2.8902678E−08 |
| $A_8$ | 9.3746653E−11 | 1.3515933E−10 | 1.8075289E−09 |
| $A_9$ | 9.9055951E−12 | 1.9590320E−10 | 2.6340159E−10 |
| $A_{10}$ | 1.4982866E−13 | 3.9350556E−11 | 1.4587862E−11 |
| $A_{11}$ | −2.0010430E−14 | 3.5025992E−12 | 8.0499326E−14 |
| $A_{12}$ | −2.0892666E−15 | 3.5647273E−14 | −1.2339364E−13 |
| $A_{13}$ | −7.8329282E−17 | −3.5937288E−14 | −1.2906191E−14 |

TABLE 3-continued

| | | | |
|---|---|---|---|
| $A_{14}$ | 5.1430970E−18 | −6.3457578E−15 | −6.0736038E−16 |
| $A_{15}$ | 7.7317898E−19 | −3.9792834E−16 | 4.2881279E−17 |
| $A_{16}$ | −3.5639788E−20 | 9.2239928E−17 | 1.3436385E−17 |

*Aspheric surface
SNo.: Surface number

In addition, Table 5 shows numerical values corresponding to the conditional expressions according to Example 3.

Figure 8:
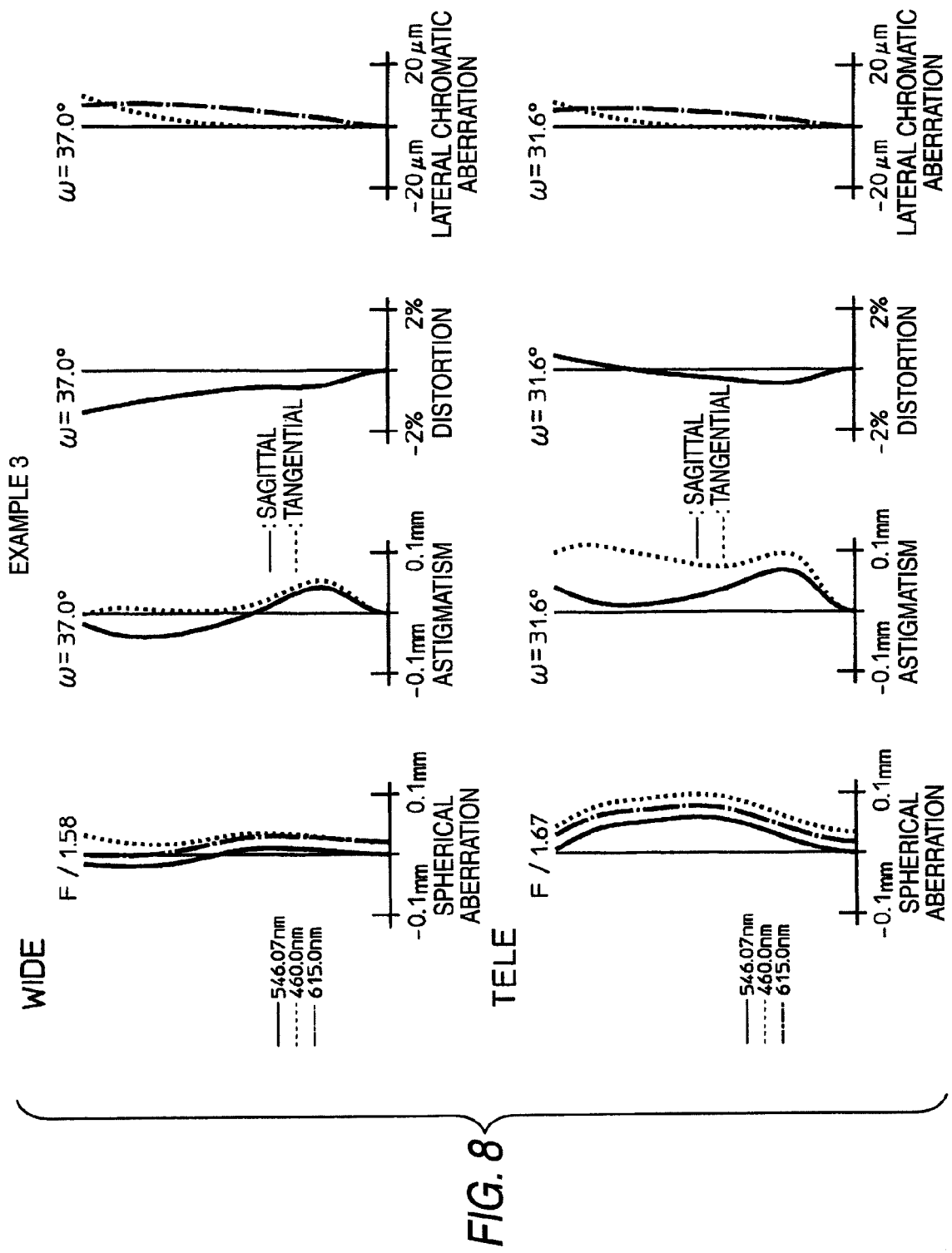
FIG. 8 is an aberration diagram showing various aberrations (spherical aberration, astigmatism, distortion, and lateral chromatic aberration) of the projection zoom lens system according to Example 3.

FIG. 8 is an aberration diagram illustrating various aberrations (spherical aberration, astigmatism, distortion, and lateral chromatic aberration) at the wide-angle end (WIDE) and the telephoto end (TELE) of the projection zoom lens system according to Example 3.

As can be seen clearly from FIG. 8, the projection zoom lens system according to Example 3 is a wide-angle lens having an angle of view 2ω of 74.0 degrees at the wide-angle end and is a fast lens having an F number of 1.58 at the wide-angle, in which aberrations are satisfactorily corrected.

Further, as shown in Table 5, the projection zoom lens system according to Example 3 satisfies the conditional expressions (1) to (4), and also satisfies the conditional expressions (1'), (2'), and (2").

Example 4

Figure 5:
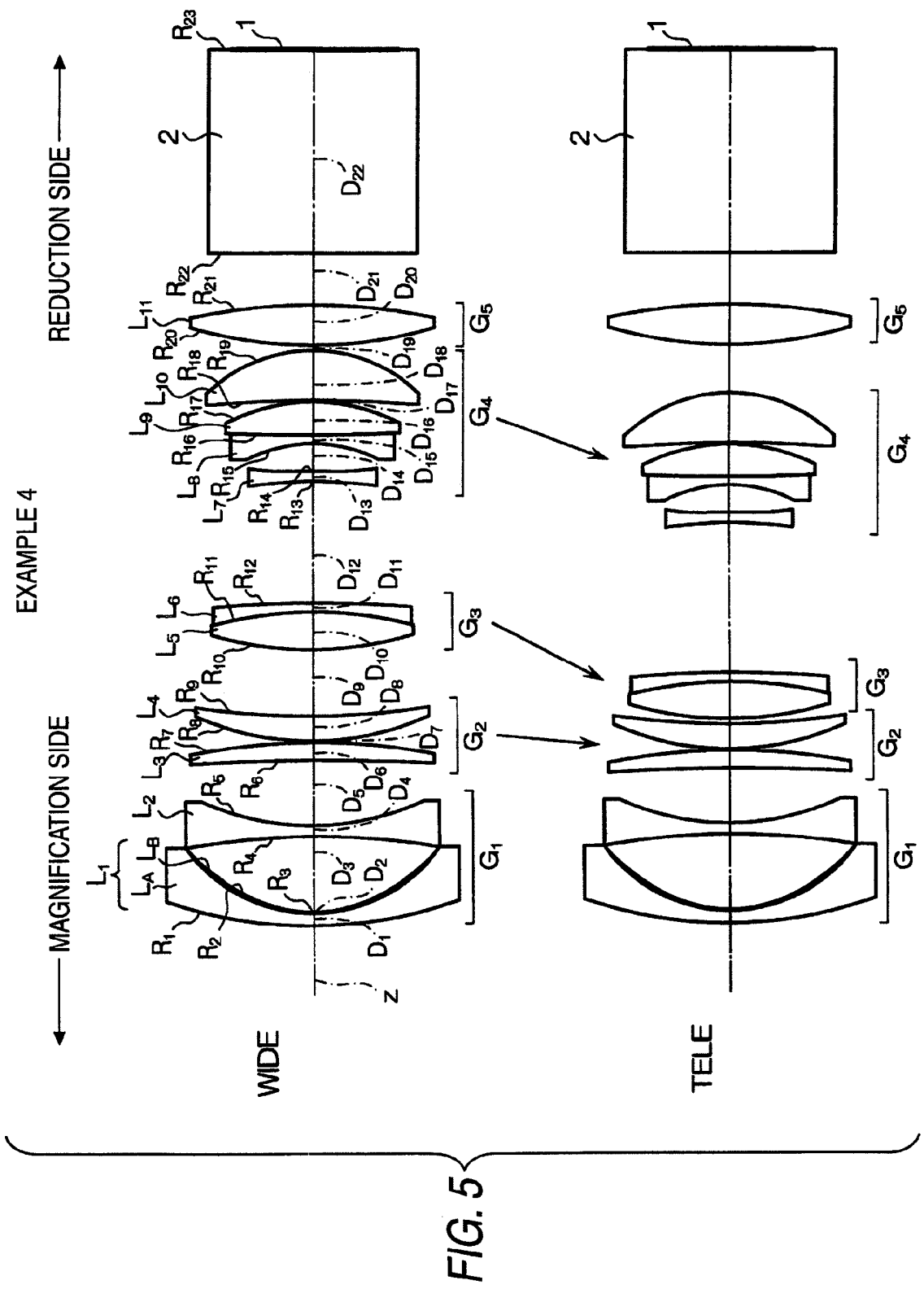
FIG. 5 is a schematic diagram showing a configuration at the wide-angle end (WIDE) and the telephoto end (TELE) of a projection zoom lens system according to Example 4 of the invention.

FIG. 5 shows a schematic configuration of the projection zoom lens system according to Example 4. The projection zoom lens system of Example 4 is different from that of Example 1 in that the third lens $L_3$ constituting the second lens group $G_2$ is formed as a positive meniscus lens having a convex surface directed toward the reduction side. Otherwise, the zoom lens system has substantially the same configuration as that of Example 1. Therefore, only data thereof will be described, and detailed description thereof will be omitted.

In Example 4, the upper part of Table 4 shows an R which is a radius of curvature of each lens surface according to the example, a D which is a center thickness of each lens and an air space between lenses, an Nd which is a refractive index of each lens at the d-line, and a νd which is an Abbe number of each lens at the d-line.

Further, the top of the Table 4 shows a focal length f (the wide-angle end to the telephoto end), a back focal length Bfw at the wide-angle end, F number Fno. (the wide-angle end to the telephoto end), and angle of view 2ω (the wide-angle end to the telephoto end). The lower part of Table 4 shows respective constants K and $A_3$ to $A_{16}$ corresponding to the respective aspheric surfaces.

TABLE 4 f = 16.12~19.34
Bfw = 26.82
Fno = 1.58~1.67
2ω = 74.00°~63.40°

| SNo. | R | D | Nd | νd |
|---|---|---|---|---|
| 1 | 62.610 | 1.80 | 1.77250 | 49.6 |
| 2 | 21.940 | 0.14 | 1.52771 | 41.8 |
| *3 | 18.831 | 11.13 | | |
| 4 | −105.158 | 1.60 | 1.48749 | 70.4 |
| 5 | 37.545 | 9.49~8.01 | | |
| 6 | −314.775 | 2.66 | 1.75520 | 27.5 |
| 7 | −88.177 | 0.20 | | |
| 8 | 39.919 | 3.67 | 1.80100 | 35.0 |
| 9 | 107.901 | 9.66~0.79 | | |
| 10 | 49.814 | 5.43 | 1.77250 | 49.6 |
| 11 | −57.283 | 1.30 | 1.84666 | 23.8 |
| 12 | −161.866 | 17.78~21.88 | | |
| *13 | −35.023 | 1.50 | 1.80348 | 40.4 |
| *14 | −93.034 | 4.02 | | |
| 15 | −20.491 | 1.20 | 1.84666 | 23.8 |
| 16 | 266.460 | 4.79 | 1.60311 | 60.6 |
| 17 | −27.372 | 0.20 | | |
| 18 | −184.022 | 7.24 | 1.65160 | 58.4 |
| 19 | −21.771 | 0.74~6.98 | | |
| 20 | 60.055 | 5.89 | 1.69680 | 55.5 |
| 21 | −82.035 | 7.40 | | |
| 22 | ∞ | 29.50 | 1.51680 | 64.2 |
| 23 | ∞ | | | |

ASPHERIC COEFFICIENT

| | SNo. | | |
|---|---|---|---|
| | 3rd surface | 13rd surface | 14th surface |
| K | 0.0000000 | 0.0000000 | 0.0000000 |
| $A_3$ | 9.5770555E−05 | −5.3599580E−06 | 0.0000000 |
| $A_4$ | −3.2987260E−05 | 2.0243816E−04 | 2.1986913E−04 |
| $A_5$ | 1.7562559E−06 | −4.2174867E−06 | 0.0000000 |
| $A_6$ | −8.1070592E−08 | −8.9207677E−07 | −1.2950452E−06 |
| $A_7$ | −3.0735421E−09 | −5.4129309E−08 | −2.8902678E−08 |
| $A_8$ | 1.0370446E−10 | 1.3515933E−10 | 1.8075289E−09 |
| $A_9$ | 1.0254142E−11 | 1.9590320E−10 | 2.6340159E−10 |
| $A_{10}$ | 9.9327585E−14 | 3.9350556E−11 | 1.4587862E−11 |
| $A_{11}$ | −3.7767470E−14 | 3.5025992E−12 | 8.0499326E−14 |
| $A_{12}$ | −3.0126874E−15 | 3.5647273E−14 | −1.2339364E−13 |
| $A_{13}$ | −5.1805087E−17 | −3.5937288E−14 | −1.2906191E−14 |
| $A_{14}$ | 1.1183660E−17 | −6.3457578E−15 | −6.0736038E−16 |
| $A_{15}$ | 1.0556827E−18 | −3.9792834E−16 | 4.2881279E−17 |
| $A_{16}$ | −6.2995870E−20 | 9.2239928E−17 | 1.3436385E−17 |

*Aspheric surface
SNo.: Surface number

In addition, Table 5 shows numerical values corresponding to the conditional expressions according to Example 4.

Figure 9:
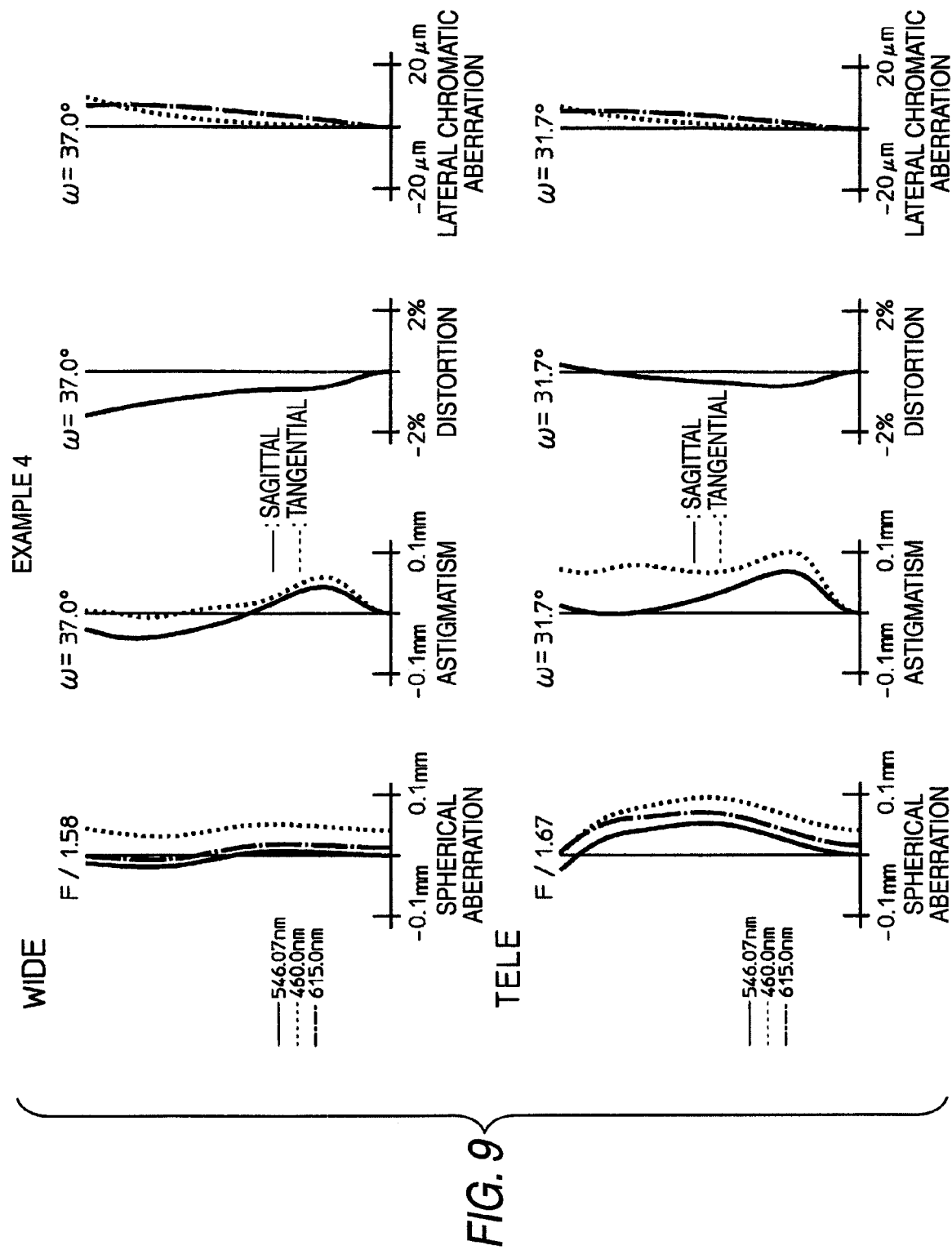
FIG. 9 is an aberration diagram showing various aberrations (spherical aberration, astigmatism, distortion, and lateral chromatic aberration) of the projection zoom lens system according to Example 4.

FIG. 9 is an aberration diagram illustrating various aberrations (spherical aberration, astigmatism, distortion, and lateral chromatic aberration) at the wide-angle end (WIDE) and the telephoto end (TELE) of the projection zoom lens system according to Example 4.

As can be seen clearly from FIG. 9, the projection zoom lens system according to Example 4 is a wide-angle lens having an angle of view 2ω of 74.0 degrees at the wide-angle end and is a fast lens having an F number of 1.58 at the wide-angle, in which aberrations are satisfactorily corrected.

Further, as shown in Table 5, the projection zoom lens system according to Example 4 satisfies the conditional expressions (1) to (4), and also satisfies the conditional expressions (1'), (2'), and (2").

Furthermore, the projection wide-angle zoom lens system according to the invention is not limited to the examples mentioned above, and may be modified to various forms. For example, it may be possible to properly modify radiuses of curvature R of the lenses and on-axis surfacings D.

Further, the projection type display apparatus according to the invention is not limited to the configurations mentioned above, and may be modified to various forms of apparatuses having the projection wide-angle zoom lens system according to the invention. As the light valve, it may be possible to use a transmissive or reflective liquid crystal display device, or a micro mirror element (for example, a digital micro mirror device manufactured by Texas Instruments Co.) in which a plurality of inclinable micro mirrors are formed on a substantially flat surface. As the illumination optical system, it may be possible to employ a proper configuration corresponding to types of the light valves.

TABLE 5

|  |  | EXAMPLE 1 | EXAMPLE 2 | EXAMPLE 3 | EXAMPLE 4 |
|---|---|---|---|---|---|
| Conditional Expression (1) | d34 | 17.67 | 17.63 | 17.66 | 17.78 |
|  | d34/fw | 1.097 | 1.093 | 1.096 | 1.103 |
| Conditional Expression (2) | d | −8.44 | −8.37 | −8.23 | −8.55 |
|  | \|d/fw\| | 0.524 | 0.519 | 0.511 | 0.530 |
| Conditional Expression (3) | ndp | 1.82638 | 1.82638 | 1.82638 | 1.77810 |
| Conditional Expression (4) | ndn | 1.82507 | 1.82507 | 1.82507 | 1.82507 |

What is claimed is:

1. A projection zoom lens system comprising, in order from a magnification side:
a first lens group having a negative refractive power;
a second lens group having a positive refractive power;
a third lens group having a positive refractive power;
a fourth lens group having a positive refractive power; and
a fifth lens group having a positive refractive power,
wherein
the first lens group has an aspheric surface,
a lens closest to the magnification side in the fourth lens group has an aspheric surface, and
the fifth lens group consists of one positive lens,
wherein
during zooming, the first and fifth lens groups remain stationary, while the second, third, and fourth lens groups are movable respectively, and
during zooming from a wide-angle end to a telephoto end, the second, third, and fourth lens groups moves toward the magnification side along an optical axis, and
wherein the following conditional expression (1) is satisfied:

$$0.8 < d34/fw \quad (1),$$

where
fw denotes a focal length of the whole system at the wide-angle end, and
d34 denotes an air space between the third lens group and the fourth lens group at the wide-angle end.

2. The projection zoom lens system according to claim 1, wherein
the fourth lens group comprises, in order from the magnification side:
a negative aspheric lens having a concave surface directed toward the magnification side;
a cemented lens formed by cementing a negative lens having a concave surface directed toward the magnification side and a positive lens having a convex surface directed toward a reduction side; and
a positive lens having a convex surface directed toward the reduction side.

3. The projection zoom lens system according to claim 2, wherein a magnification-side surface of the aspheric lens located closest to the magnification side in the fourth lens group is formed as a curved surface located closer to the reduction side than a spherical surface in an area out of the optical axis, and
the spherical surface comes into contact with the magnification-side surface on the optical axis and has the same algebraic sign and the same curvature as the magnification-side surface.

4. The projection zoom lens system according to claim 2, wherein the following conditional expression (2) is satisfied:

$$0 < |d/fw| < 1.00 \quad (2),$$

where
d denotes a distance from a magnification-side focal point of a composite lens group of the fourth lens group and the fifth lens group at the wide-angle end to a vertex of the magnification-side surface of the lens located closest to the magnification side in the fourth lens group.

5. The projection zoom lens system according to claim 2, wherein the following conditional expression (3) is satisfied:

$$1.75 < ndp \quad (3),$$

where
ndp denotes an average of refractive indices of the positive lenses in the second lens group at the d-line.

6. The projection zoom lens system according to claim 2, wherein the following conditional expression (4) is satisfied:

$$1.75 < ndn \quad (4),$$

where
ndn denotes an average of refractive indices of the negative lenses in the fourth lens group at the d-line.

7. The projection zoom lens system according to claim 2, wherein
a lens closest to the magnification side in the first lens group is a negative meniscus lens having a convex surface directed toward the magnification side, and
a reduction-side surface of the negative meniscus lens is aspheric.

8. The projection zoom lens system according to claim 7, wherein
the lens closest to the magnification side in the first lens group is a compound aspheric lens having a glass lens and a resin layer,
the resin layer formed on a surface of the glass lens, and
a surface of the resin layer on a side opposite to the glass lens is aspheric.

9. The projection zoom lens system according to claim 2, wherein
the lens closest to the magnification side in the first lens group is a compound aspheric lens having a glass lens and a resin layer,
the resin layer formed on a surface of the glass lens, and
a surface of the resin layer on a side opposite to the glass lens is aspheric.

10. A projection type display apparatus comprising:
a light source;
a light valve;
an illumination optical unit guiding rays originated from the light source into the light valve; and
the projection zoom lens system according to claim 2,
wherein the rays originated from the light source are optically modulated by the light valve, and are projected on a screen by the projection zoom lens system.

11. The projection zoom lens system according to claim 1, wherein a magnification-side surface of the aspheric lens located closest to the magnification side in the fourth lens group is formed as a curved surface located closer to the reduction side than a spherical surface in an area out of the optical axis, and
the spherical surface comes into contact with the magnification-side surface on the optical axis and has the same algebraic sign and the same curvature as the magnification-side surface.

12. The projection zoom lens system according to claim 1, wherein the following conditional expression (2) is satisfied:

$$0<|d/fw|<1.00 \quad (2),$$

where d denotes a distance from a magnification-side focal point of a composite lens group of the fourth lens group and the fifth lens group at the wide-angle end to a vertex of the magnification-side surface of the lens located closest to the magnification side in the fourth lens group.

13. The projection zoom lens system according to claim 1, wherein the following conditional expression (3) is satisfied:

$$1.75<ndp \quad (3),$$

where ndp denotes an average of refractive indices of the positive lenses in the second lens group at the d-line.

14. The projection zoom lens system according to claim 1, wherein the following conditional expression (4) is satisfied:

$$1.75<ndn \quad (4),$$

where ndn denotes an average of refractive indices of the negative lenses in the fourth lens group at the d-line.

15. The projection zoom lens system according to claim 1, wherein a lens closest to the magnification side in the first lens group is a negative meniscus lens having a convex surface directed toward the magnification side, and a reduction-side surface of the negative meniscus lens is aspheric.

16. The projection zoom lens system according to claim 15, wherein the lens closest to the magnification side in the first lens group is a compound aspheric lens having a glass lens and a resin layer, the resin layer formed on a surface of the glass lens, and a surface of the resin layer on a side opposite to the glass lens is aspheric.

17. The projection zoom lens system according to claim 1, wherein the lens closest to the magnification side in the first lens group is a compound aspheric lens having a glass lens and a resin layer, the resin layer formed on a surface of the glass lens, and a surface of the resin layer on a side opposite to the glass lens is aspheric.

18. A projection type display apparatus comprising:

a light source;

a light valve;

an illumination optical unit guiding rays originated from the light source into the light valve; and the projection zoom lens system according to claim 1, wherein the rays originated from the light source are optically modulated by the light valve, and are projected on a screen by the projection zoom lens system.

\* \* \* \* \*